No. 655,135. Patented July 31, 1900.
G. W. TURNER & S. F. BUTLER.
AUTOMATIC STOP FOR ENGINES.
(Application filed Mar. 17, 1898.)

(No Model.) 2 Sheets—Sheet 1.

Witnesses:

Inventors:
Geo. W. Turner &
Smiley F. Butler
by their Attorneys.
Howson & Howson No. 655,135. Patented July 31, 1900.
G. W. TURNER & S. F. BUTLER.
AUTOMATIC STOP FOR ENGINES.
(Application filed Mar. 17, 1898.)

(No Model.) 2 Sheets—Sheet 2.

Witnesses:
Inventors: Geo. W. Turner &
Smiley F. Butler
by their Attorneys,

UNITED STATES PATENT OFFICE.

GEORGE W. TURNER AND SMILEY F. BUTLER, OF GLOUCESTER CITY, NEW JERSEY.

AUTOMATIC STOP FOR ENGINES.

SPECIFICATION forming part of Letters Patent No. 655,135, dated July 31, 1900.

Application filed March 17, 1898. Serial No. 674,240. (No model.)

*To all whom it may concern:*

Be it known that we, GEORGE W. TURNER and SMILEY F. BUTLER, citizens of the United States, and residents of Gloucester City, Camden county, New Jersey, have invented certain Improvements in Stops for Engines, of which the following is a specification.

Our invention relates to mechanism controlled and operated automatically by the governor of a steam-engine for stopping instantly the operation of the devices controlling the movement of the inlet-valves, so that the supply of steam to the cylinder will be cut off.

The object of our invention is to stop the engine the moment the speed of the same rises above the normal, a condition due either to an increase of pressure or to a decrease of the load, and as an instance of the latter may be mentioned the breaking of a belt. The engine being relieved of the drag of the broken belt would tend to increase its speed. The mechanism forming the subject of our invention is so combined with the governor that as soon as the balls of the same rise under the centrifugal action due to increased speed the valve-controlling mechanism is tripped and the valve-gear is thrown out of action, remaining so until the engine is started again.

Our invention is fully illustrated in the accompanying drawings, in which—

Figure 1:
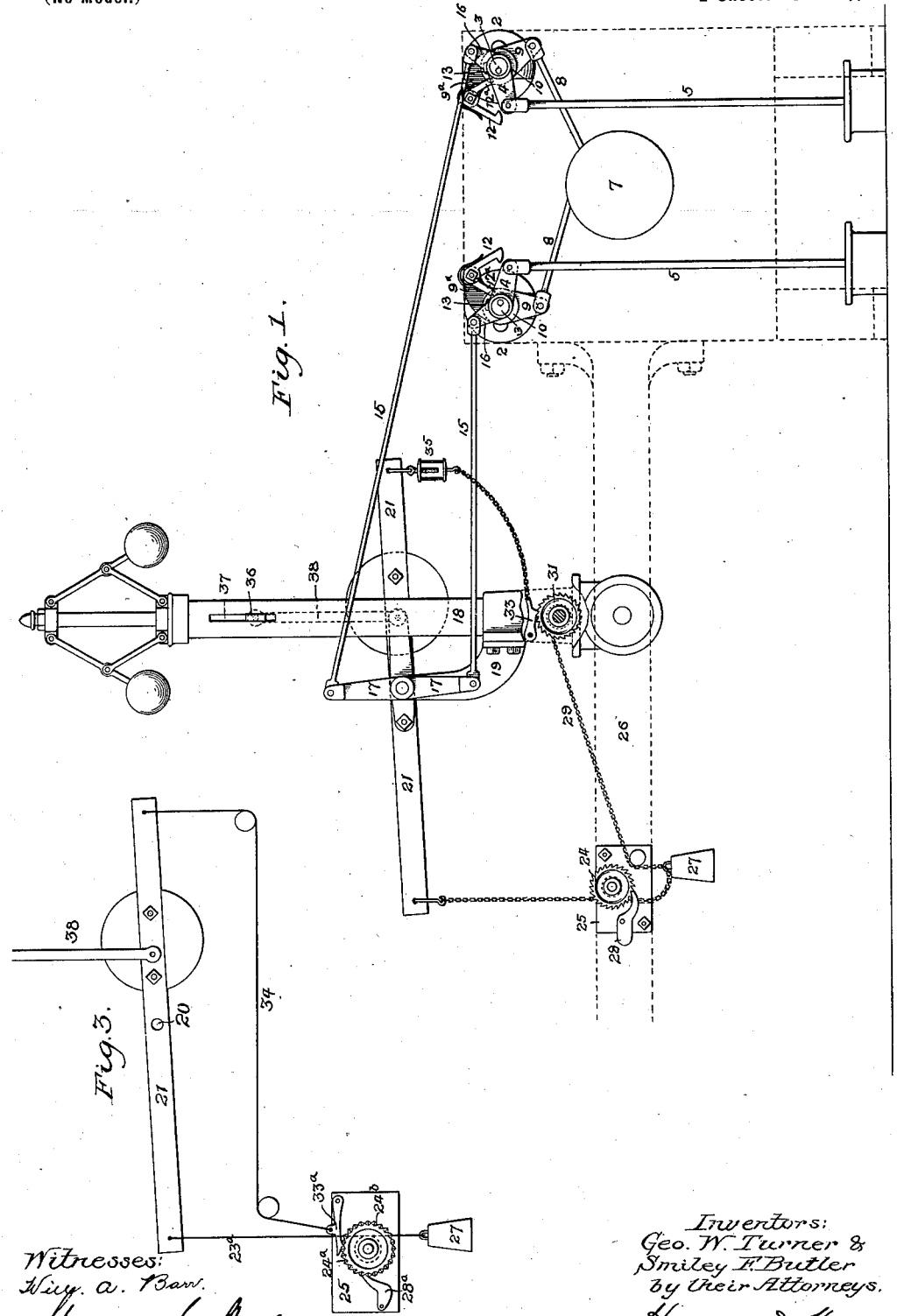
Figure 2:
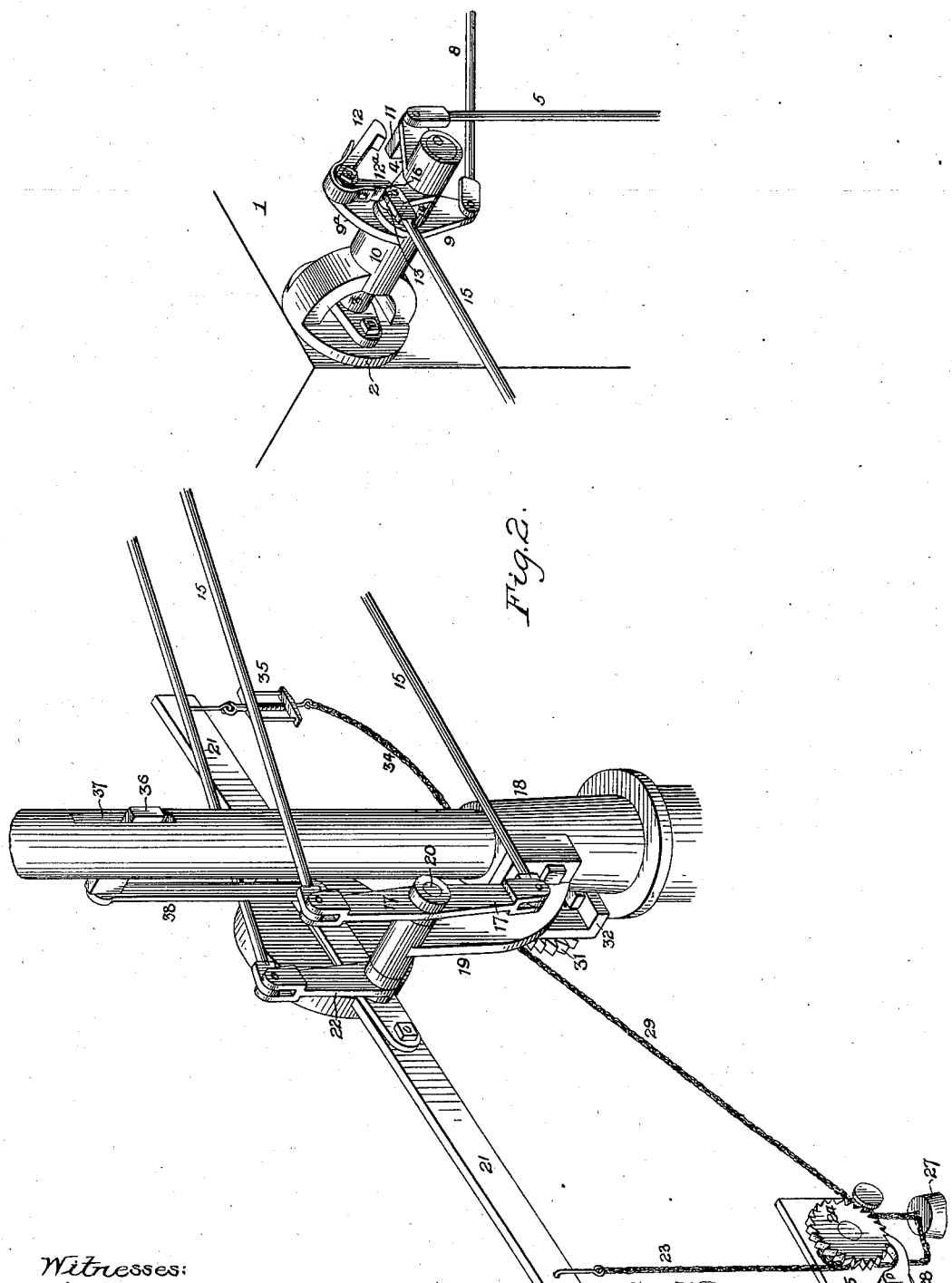

Figure 1 is a side elevation of a portion of a Corliss engine, showing the governor and the mechanism forming the subject of our invention. Fig. 2 is a perspective view of the same, and Fig. 3 is a diagram of a modification of our invention.

We have applied and show herewith our improvement in connection with an engine of the Corliss type, although it will be understood and clearly evident to any one skilled in the art that with but slight modification our invention may be applied to any form of steam-engine employing a ball-governor and automatic cut-off valves.

In the drawings, 1 represents the steam-chest of the engine, and 2 the steam-inlet valves, carried by stems 3, upon which also are mounted the devices for operating the valves so as to admit steam to the cylinder. Pivoted to an arm 4, carried at the end of the stem 3, is a rod 5, at the lower end of which a piston is carried, fitting a dash-pot 6. This rod 5 is raised against the pressure of a spring within the dash-pot and when released by the valve-gear is retracted by said spring and serves to cut off the steam. The valves are worked from the disk plate 7 at the center of the steam-chest, rods 8, carried by the same, being connected to arms 9 on the sleeve 10, mounted on the stem 3 of the valve. The arm 4 is provided with a lug 11, with which a spring-hook 12, pivoted to an arm $9^a$ on the sleeve 10, is adapted to engage when said sleeve is operated from the disk plate 7. Under ordinary conditions this spring-hook 12 engages the lug 11 on the arm 4 as the sleeve 10 is rocked and carries the said rod 5 upward until the heel $12^a$ of the hook is tripped by a projection 13, carried by a sleeve 14, held in a predetermined position by means of a rod 15, connected to an arm 16 on this sleeve and to a two-armed operating-lever 17, mounted on the governor-pedestal 18. When this lug or projection 13 is in its normal position, the valve-gear serves to open the inlet-valves regularly and steam is cut off by the sudden release of the spring-hook 12 and the dropping of the rod 5. This is the ordinary manner of operating the inlet-valves of a Corliss engine.

Our invention consists of certain improved means for tripping the hook 12 whenever there is any sudden increase in the speed of the engine, thereby cutting off the inlet of steam to the cylinder and stopping the engine, the hook being held in the tripped position until the causes which led to the sudden increase in speed have been remedied and the parts have been returned to their normal operative position.

The mechanism for moving the sleeve 14, carrying the projection 13, so as to bring said projection into engagement with the heel of the spring-hook 12 is as follows: Mounted on the lower part of the governor-pedestal 18 is a bracket 19, in which is mounted a rock-shaft 20, carrying at one end the two-armed lever 17, at the other end a weighted arm or lever 21, and between the same an arm or lever 22, by which connection may be made with the valve-gear of the inlet-valves of the high-pressure cylinder of a compound Corliss engine when used with such form of engine. The two-armed lever 17 is connected, by means of rods 15, with the valve-gear of the inlet-valves of the cylinder. The weighted lever 21 is held in the normal position, the weight acting as a counterbalance, by means of a chain 23, connected to one end of the same and passing down and around the hub of a ratchet-pinion 24, mounted on a plate 25, secured to the frame 26 of the engine, the chain being attached at its lower end to a weight 27. The ratchet-wheel 24 is provided with a weighted pawl 28 for preventing backward movement of the same and the consequent raising of the light arm of the weighted lever 21. The weight 27, to which the chain 23 is attached, is supported by means of a chain 29, wound on a hub 30 of a ratchet-pinion 31, carried by a bracket 32, secured at the bottom of the governor-pedestal. This pinion is held against turning by a trip-pawl 33, to which is attached a chain 34, carried by the heavy end of the weighted lever 21, an adjustable swivel 35 being connected to the chain so as to regulate the amount of movement necessary to trip the pawl 33. On the inside of the governor-pedestal is the moving rod, carried up when the balls rise, and carried by this rod is a bar 36, projecting through a slot 37 in the upper part of the pedestal and connected with the weighted lever 21 by a rod or link 38.

The operation is as follows: When the governor rises to an undue extent under increased speed of the engine from any cause whatever, the bar 36 is carried up by the moving rod inside the governor-pedestal, and this bar being connected to the weighted lever 21 by the link 38 the heavy end of the weighted lever 21 is raised. This action trips the pawl 33, releasing the ratchet-pinion 31 and the chain 34, carrying the weight 27, and said weight falls, carrying with it the chain 23, secured to the light end of the weighted lever 21, and thus retaining the weighted lever 21 in the new position, the ratchet-pinion 24 being held by the weighted pawl 28. This movement of the weighted lever 21 has changed the position of the two-armed lever 17 and operated the rods 15, so as to turn the sleeves 14 to bring the projection 13 into the path of the heel of the said spring-hook 15, and thus prevent engagement of said hook with the rod 5 and the admission of steam to the inlet-valves of the engine. To start the engine, the mechanism is simply returned to the normal position, as shown in Fig. 1, and it will remain in this position just so long as the pressure and speed of the engine are normal.

In Fig. 3 we have shown a modification of our invention in which a single ratchet-pinion 24, having two sets of teeth $24^a$ and $24^b$, inclined in opposite directions, is used, serving to support the weight 27 and held against movement by the pawl $33^a$, controlled by the weighted lever 21, being connected to said lever by a chain or cord 34. In this form of the device the chain $23^a$, supporting the weight 27, passes around a drum on the hub of the ratchet-pinion 24 and is connected to the light end of the weighted lever 21. This modified form of the mechanism operates in the same manner as the mechanism shown in Figs. 1 and 2. When the heavy end of the weighted lever 21 is carried up by the rod 38, the pawl $33^a$ is released from its engagement with the teeth $24^a$ of the ratchet-pinion 24 and allows the weight 27 to fall, backward rotation of the pinion being prevented by the engagement of the pawl $28^a$ with the teeth $24^b$ of the same.

Having thus described our invention, we claim and desire to secure by Letters Patent—

1. The combination of the inlet-valve-operating mechanism of a steam-engine, a weighted lever under positive control of the governor, and intermediate devices connected to said lever whereby the movement of the same is caused to regulate the closing of the inlet-valves, with a suspended weight arranged to cause the said governing-lever to be held in a position in which the inlet of steam to the engine is prevented, and means operated by the governing-lever for releasing said suspended weight.

2. The combination of the inlet-valve-operating mechanism of a steam-engine, a weighted lever under positive control of the governor, and intermediate devices connected to said lever whereby the movement of the same is caused to regulate the closing of the inlet-valves, with a suspended weight arranged to cause the said governing-lever to be held in a position to operate said intermediate devices and cut off the inlet of steam to the engine, a retainer for said weight and a trip for said retainer connected to the governing-lever whereby when the latter is moved to a certain position by the governor, the weight will be released and act upon the governing-lever, substantially as described.

3. The combination of the inlet-valve-operating mechanism of a steam-engine, a weighted lever under control of the governor, and intermediate devices whereby the movement of said lever is caused to regulate the opening of the inlet-valves, with a suspended weight adapted to move the said governing-lever into position to cut off the inlet of steam to the engine, said intermediate devices comprising a ratchet-pinion 31 mounted at the base of the governor-pedestal, a drum on the hub of said pinion to which is connected and wound a chain carrying the weight, a ratchet-pinion 24 mounted on the frame of the engine, a chain also secured to the weight passing around the hub of said pinion 24 and connected to the light end of the governing-lever, a retaining-pawl for the ratchet-pinion 24, a retaining-pawl for the ratchet-pinion 31, and a trip for the latter pawl connected to the governing-lever, whereby when the latter is moved to a certain position by the governor, the pinion 31 will be released allowing the weight to drop and act upon the governing-lever, substantially as described.

4. The combination in a device of the character described, of the governor-pedestal, a bracket carried by the same, a governor, inlet-valve mechanism, a weighted lever hung to said bracket and positively operated by the governor, a two-armed lever operatively secured to the weighted lever and connected to the inlet-valve mechanism, a suspended weight connected to one end of the governing-lever and adapted to move said lever into such position that the two-armed lever will operate the valve mechanism to cut off the inlet of steam, a retainer for said weight, a trip for operating said retainer connected to the opposite end of the governing-lever, whereby when the latter is moved to a certain position by the governor, the weight will be released and act upon the governing-lever, substantially as described.

In testimony whereof we have signed our names to this specification in the presence of two subscribing witnesses.

GEO. W. TURNER.
SMILEY F. BUTLER.

Witnesses:
MURRAY C. BOYER,
JOS. H. KLEIN.